Patented Sept. 23, 1924.

1,509,467

UNITED STATES PATENT OFFICE.

AUGUSTE BOIDIN, OF SECLIN, FRANCE, AND JEAN EFFRONT, OF BRUSSELS, BELGIUM.

METHOD FOR THE SIMULTANEOUS PRODUCTION OF DEMINERALIZED AMYLACEOUS SUBSTANCES AND LOWER NITROGENOUS MATTER FOR FOOD PURPOSES BY THE USE OF TUBERS OR CEREALS IN WHOLE OR BROKEN GRAINS.

No Drawing.  Application filed November 9, 1921.  Serial No. 514,099.

*To all whom it may concern:*

Be it known that we, AUGUSTE BOIDIN, a citizen of France, and JEAN EFFRONT, a subject of the King of Spain, residing, respectively, at Seclin, Nord Department, Republic of France, and Brussels, Belgium, have invented certain new and useful improvements in the method for the simultaneous production of demineralized amylaceous substances and lower nitrogenous matter for food purposes by the use of tubers or cereals in whole or broken grains; and we do declare the following to be a full, clear, and exact description of the invention, such as will enable others skilled in the art to which it appertains to make and use the same.

In the process in which alkalis are employed for the extraction of the proteins of cereals, there is obtained a product of a poor quality which is not proper for human food. If on the contrary mineral or organic acids are employed, the yield of product is very small by reason of coagulations which occur. In the first as well as the second case the cereals are treated with very considerable volumes of alkaline or acidulated water, whence arises a great expense for the concentration of the nitrogenous extracted matter.

One object of the present invention is to provide a process for the treatment of farinaceous matters consisting in submitting the same, without any previous treatment, to a slightly acid fermentation, at a temperature of at least 50° C. and with the use of a very reduced amount of liquid, thereby allowing to obtain, on the one hand, concentrated nitrogen containing extracts, and on the other hand, the amylaceous matter deprived of minerals.

A second object of the invention consists in submitting the farinaceous matters to a slightly acid fermentation, at 55° C. in the presence of a small amount of water under a strong aeration, this operation being repeated until the solvents have dissolved from 50 to 70% of the nitrogen contained in the matters under treatment.

A third object of the invention consists in submitting the farinaceous matters to a slightly acid fermentation, at a temperature of at least 50° C. and in the presence of a small amount of water, thereby allowing to obtain, on the one hand, concentrated nitrogen containing extracts, and on the other hand, the amylaceous matter deprived of minerals, in evaporating the nitrogen containing extracts until a concentration between 20° and 25° B. is obtained, and in separating the organic salts of magnesia which are precipitated under the influence of this concentration.

This method, whereby all the above-mentioned drawbacks are eliminated, is based on the discovery that if by reason of a slightly acid fermentation, carefully avoiding all ammoniacal or putrid fermentation and working at a relatively high temperature, there is brought about an almost total demineralization of the cereals employed, and it becomes possible at the same time to readily separate from these cereals the major part of the nitrogenous matter contained therein.

To obtain these two simultaneous separating effects, it suffices to treat these cereals with a very small volume of liquid.

In this process a previous malting action is not required, and the treatment may be effected with whole or broken grains, according to their original hardness, and the cereals will retain their original form while becoming much more friable.

As concerns the starch of the cereals or tubers which are treated, it is neither saccharized nor dissolved during the treatment, but its properties are changed, and the following considerations are to be noted:

1—This saccharizable starch, when treated by diastases under ordinary conditions, will dissolve more readily, and it affords a much larger proportion of dextrines and non-fermentable substances (maltodextrines) than the same cereals when non-treated.

2—The temperature of the formation of clear starch with the treated starch is reduced by 5° to 10° C.

3—The formation of clear starch is much easier and it is not required to have recourse to a heating under pressure in order to obtain a perfect quality of clear starch.

4—The preparation of the starch by making use of the treated grains is facilitated by the fact that these grains or tubers are partially disaggregated, and to such a degree that they may be crushed between the thumb and finger when in the dry state.

5—The grains treated in the whole or broken state may be employed directly for various uses such for instance as for the preparation of certain sizing material or pastes, without making it necessary to effect the removal of the starch according to the methods employed in starch works.

As regards the albuminoid substances removed from the raw material, these are produced directly in the form of assimilable nitrogen. These nitrogenous extracts which are highly mineralized have a great similarity to the best qualities of beef extract, thus giving them a greater value; the vegetable nitrogenous matter may in this case be used to advantage as human food, whereas the extracts obtained by the known methods can only be employed for feeding animals or as fertilizer.

The qualities herein enumerated relating to the two main products, that is the de-nitrogenized and de-mineralized grains and the peptones can only be obtained when the de-mineralization attains 80 or 90% of the mineral matter of the cereals and upon the removal of the whole amount of the nitrogen susceptible of being dissolved, that is, from 50 to 70% of the whole amount of nitrogen in the grain.

In the case of rice treatment, this method is carried out in the following manner:

There is employed 1 part rice and 1 part water, this being placed in the heating chamber at about 55° C. with good aeration and kept in this state for one day.

From 10 to 20% of the grains separated from the liquid resulting from this first treatment are then taken, these being mixed with grains not as yet placed in the liquid, water is added and a good aeration obtained, and so on, continuing the treatment until there is dissolved per 24 hours a minimum of 50% nitrogen with a minimum degree of acidity, expressed in terms of sulphuric acid, of 4 grammes per litre.

A much more reliable operation is carried out by making use of the rice bacillus which acts during this operation. In order to produce the same, the following method may be employed.

Non-bleached rice is placed in the heating chamber at 50° C., it is wet with 20 to 25 per cent of its weight of sterilized water, and the rice is allowed to remain for one day at a temperature of 50°, being kept in a properly wet condition; at the end of this time there is removed 10 to 20% of the weight of the rice which is to be used for the active part of a second operation, this latter being carried out in the same manner.

After a number of like operations it is found that a certain spored microbe predominates over all others, and the culture is then diluted in sterilized water and heated for half-an-hour on the boiling water bath.

It is then required to proceed to isolate the said spored and acidulating microbe by the known methods.

When once isolated, the bacillus is put through a forming process whereby it is adapted to its new function, by means of a series of cultures carried out upon products which are continually richer in nitrogen, until it will dissolve in 24 hours from 50 to 70% of the nitrogen of the rice in the form of amine acids and confers upon the liquid an acidity of 4 to 8 grammes per litre. It is then put through a forming process starting from 50° and reaching 60° or even more. A microbe thus formed will produce good results in industrial operations and will take the predominance over all other microbe species.

This microbe has a very striking resemblance to the bacillus subtilis like this latter, it is spored, and its spores will withstand a prolonged heating in distilled water on the boiling water bath; upon liquid mediums it forms a film resembling a spider web; it saccharizes soluble starch and produces acid and gas at the expense of the saccharose, while with glucose it produces no gas but exclusively acid.

When once habituated to musts which become continually richer in nitrogen and to constantly increasing temperatures, this proteolytic bacillus now acquires the property of producing a considerable number of oxy-acids among which lactic acid predominates.

Below is given by way of example the preferred method for the treatment of rice in grains by means of the said bacterial culture.

The rice mixed with 1 or 2% bacterial culture is placed in a receptacle together with exactly the requisite amount of water to cover the grain.

The process is carried out in such manner that upon completing the mixture the temperature of the mass shall be at least 48° C. and air is blown into the mass to increase the development of the bacillus which is essentially aerobic. The bacillus is allowed to act upon the rice for 12 to 36 hours, the temperature of the mixture being kept above 48° C. The operation is stopped when it is found that the density of the liquid no longer increases and that the albumen no longer dissolves.

The nitrogenized extract is removed and is then placed in a decanting and clarifying receptacle which is kept at 55° C. in order to effect the concentration of this extract. The grain is then preferably washed in a centrifugal washer, whereby the mass is exhausted of its contents.

This treatment affords per 100 kilogrammes of rice, 30 to 35 litres of extract at 8 to 10° Balling in the first extraction, and after the washings there is collected a total volume of 75 to 80 litres of extract per 100 kilogrammes of rice which shows an average of 5° to 6° Balling and an acidity of 4 to 5 grammes per litre. In this manner there is removed from the rice 5 to 6 kilogrammes of extract per 100 kilogrammes, containing more than half the nitrogen of the grain.

Inasmuch as experience shows that each raw material carries on its surface a spored bacillus which after being properly formed is susceptible of carrying out the treatment of this raw material in a more advantageous manner than the bacteria which are selected and formed upon other raw materials, it is preferable to employ other bacteria when other raw material is used and to assure the predominance of the most active species by operating according to the method above indicated for rice treatment. For each raw material the proportion of water to be added will vary according to the amount which each product is able to absorb, for it is necessary that the bacillus shall contain a sufficient amount of moisture whereby it may develop properly. For instance, for the soja bean it is proposed to employ about two parts water for one part of soja bean. For potatoes which are reduced by scraping, it is required on the contrary to eliminate from the treatment all the juice which can be removed by draining or pressing this scraped pulp, in such manner as to afford the absolute predominance of the aerobic microbes in the successive cultures and to entirely eliminate the microbes of putrefaction.

When the grain under treatment contains a rather high percentage of sugar, it is advantageous to remove the first water in half-an-hour or an hour in order to eliminate the excess of sugar which would hinder the dissolving of the nitrogenous matter. This sugar already contained in the grains before the treatment may also be suppressed by the addition of yeast or mycoderm.

The nitrogenous liquid which is decanted at the end of the operation generally contains a small amount of coagulable albumen, and to eliminate the latter the nitrogenous extract clarified by standing is heated to ebullition and this albumen is again treated in a subsequent operation.

The decanted nitrogenous extract is evaporated in a multiple action apparatus after partially neutralizing the same if required. It is then concentrated to 20–25° Baumé and upon cooling it deposits fine needle-like crystals of lactate of magnesia.

When this crystallization is completed, the evaporation may be continued until the mass becomes solid by cooling.

The soaked grains separated from the nitrogenous extract are allowed to dry at 40 to 50° in a drier such as is used in starch works, for instance. This grain which still keeps its original shape may be easily crushed and may be substituted for pure rice starch in numerous applications as herein set forth.

Claims:—

1. Process for the treatment of farinaceous matters consisting in submitting the same, without any previous treatment, to a slightly acid fermentation, at a temperature of at least 50° C. and with the use of a very reduced amount of liquid, thereby allowing to obtain, on the one hand, concentrated nitrogen containing extracts and, on the other hand, the amylaceous matter deprived of minerals.

2. Process for the treatment of farinaceous matters consisting in submitting the same to a slightly acid fermentation, at 55° C., in the presence of a small amount of water under a strong aeration, this operation being repeated until the solvents have dissolved from 50 to 70% of the nitrogenous matter contained in the matters under treatment.

3. Process for the treatment of farinaceous matter consisting in submitting the same to a slightly acid fermentation, at a temperature of at least 50° C. and in the presence of a small amount of water, thereby allowing to obtain, on the one hand, concentrated nitrogen containing extracts, and, on the other hand, the amylaceous matter deprived of minerals, in evaporating the nitrogen containing extracts until a concentration between 20 and 25° Baumé is obtained, and in separating the organic salts of magnesia which are precipitated under the influence of this concentration.

In testimony, that we claim the foregoing as our invention, we have signed our names in presence of two subscribing witnesses.

AUGUSTE BOIDIN.
JEAN EFFRONT.

Witnesses:
F. PAYRAUD,
EMIL VAN MONSEELE.